3,530,194
PROCESS FOR THE CATALYTIC CONVERSION OF HYDROCARBONS WITH STEAM
Willem C. J. Quik and Pieter A. van Weeren, Amsterdam, Netherlands, assignors to Shell Oil Company, New York, N.Y., a corporation of Delaware
Filed Nov. 8, 1967, Ser. No. 681,547
Claims priority, application Netherlands, Nov. 17, 1966, 6616179
Int. Cl. B01j 11/74; C01b 1/16; C07c 3/58
U.S. Cl. 260—672                                9 Claims

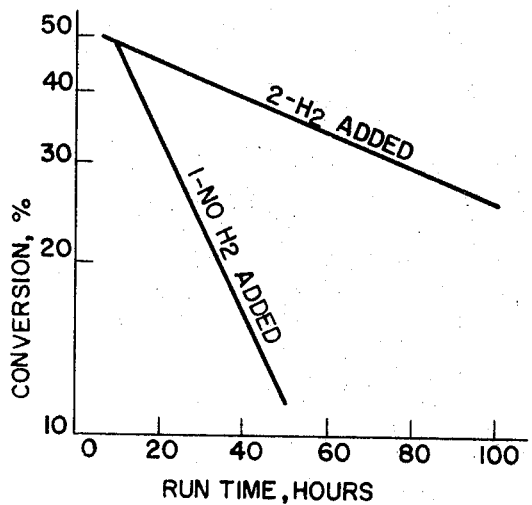
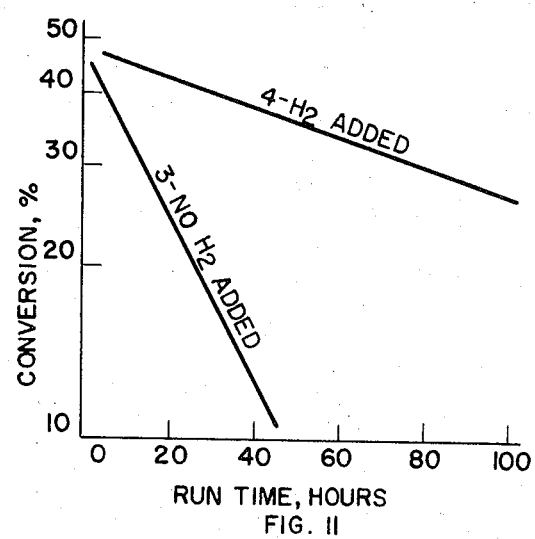
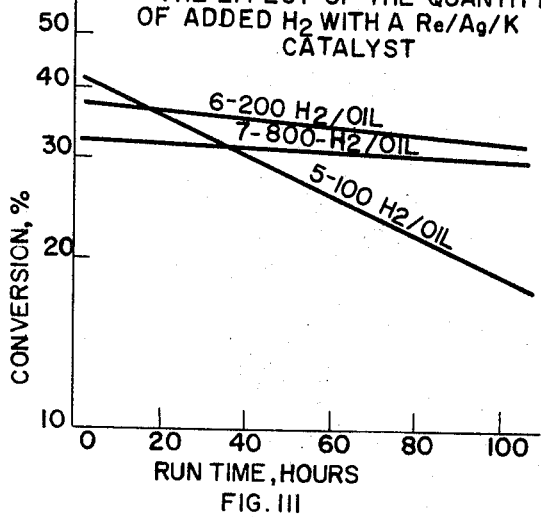
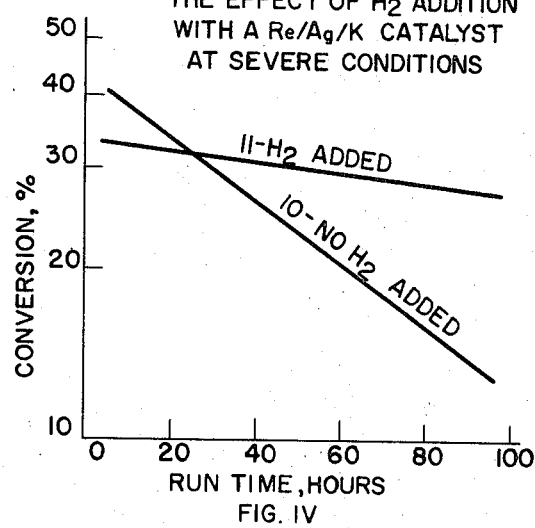

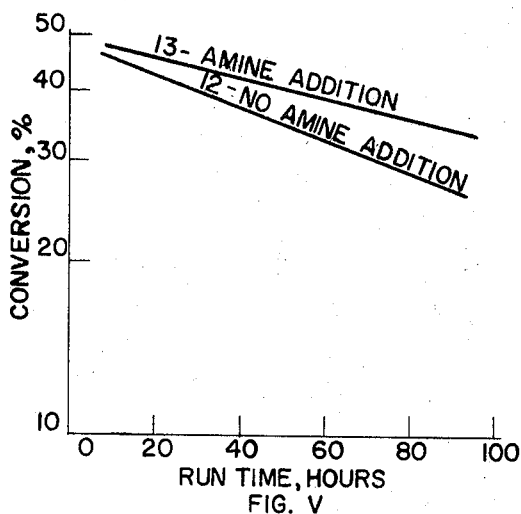
THE EFFECT OF AMINE ADDITION
FIG. V
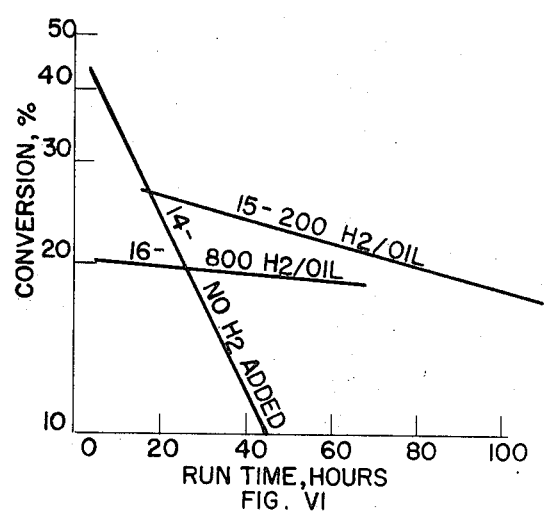
THE EFFECT OF $H_2$ ADDITION WITH A Co/Mo CATALYST
FIG. VI
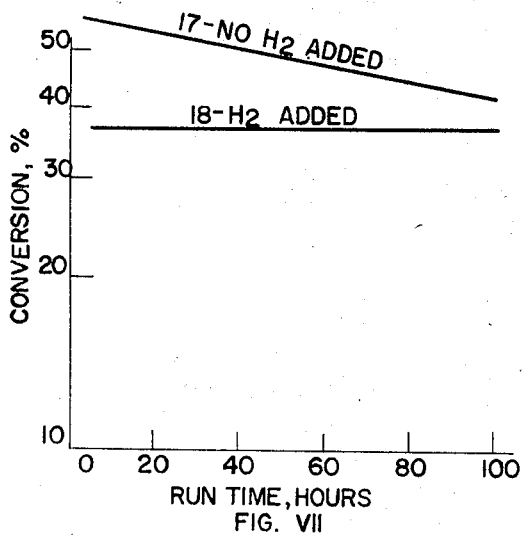
THE EFFECT OF $H_2$ ADDITION ON LIGHT FEED CONVERSION
FIG. VII
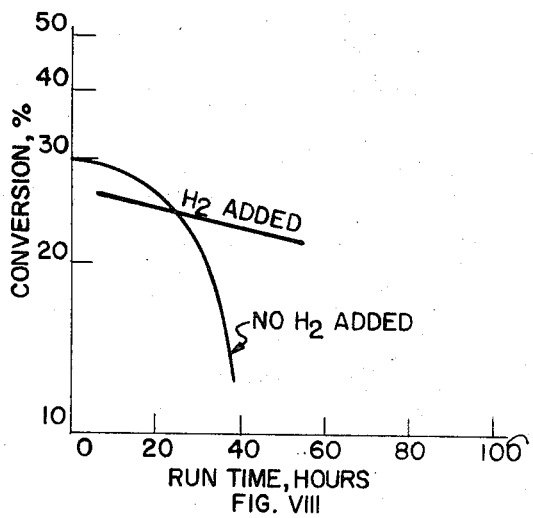
THE EFFECT OF $H_2$ ADDITION ON TOLUENE DEAKYLATION
FIG. VIII United States Patent Office 3,530,194
Patented Sept. 22, 1970

ABSTRACT OF THE DISCLOSURE

A process for the catalytic conversion of hydrocarbons in the presence of steam and a catalyst containing rhenium into hydrogen and lower molecular weight hydrocarbons in which catalyst performance is significantly improved by addition of hydrogen to the feed.

BACKGROUND OF THE INVENTION

Field of the invention

The invention relates to a process for the catalytic conversion of hydrocarbons with steam for the production of hydrogen and one or more hydrocarbons of lower molecular weight.

In particular, the invention relates to a process for the production of mixtures containing hydrogen and one or more hydrocarbons by catalytic conversion of hydrocarbons with steam, in which the conversion of the hydrocarbons with steam takes place with addition of hydrogen and in the presence of a catalyst on a carrier, which contains one or more metals from Groups V, VI, VII and VIII of the Periodic System of Elements.

Description of the prior art

The conversion of hydrocarbons with steam in the presence of a catalyst for the preparation of hydrogen is well known. The catalyst usually employed in this process is nickel.

Nickel catalysts are active but sensitive to sulfur which is a serious drawback since much of the oils suitable as feed to the process contains sulfur. Thus, desulfurization is usually required.

It is also known to carry out the process with catalysts which are insensitive to sulfur, such as, for example, sulfided supported rhenium catalysts.

SUMMARY OF THE INVENTION

It has now been found that more stable operation is obtained if the conversion of hydrocarbons with steam takes place with addition of hydrogen and in the presence of a catalyst supported on a carrier, which contains one or more metals from Groups V, VI, VII and VIII of the Periodic System of Elements.

In the process according to the invention at least 100 standard liters and preferably more than 200 standard liters of hydrogen are added per liter of the hydrocarbons to be converted. More preferably, at least 400 standard liters of hydrogen are added, for example, 800 standard liters gives excellent results.

The quantity of hydrogen required may be determined in each case by those skilled in the art. The quantity will depend, among other things, on the nature of the catalyst employed, composition of the feed, reaction time, reaction temperature, reaction pressure and quantity of steam employed.

The hydrogen may be added in any desired manner, for example by partially cracking the starting material before converting it with steam. Hydrogen-containing gases, such as reformer exit gas, generator gas, coke furnace gas, cracking gases and the like may also be successfully employed. It is preferred that the added hydrogen consist entirely or at least partially of the gas produced in the process, from which, if desired, undesirable components may be removed.

The content of the catalyst may vary within very wide limits. As a rule metal contents between 0.1 and 30 percent by weight and particularly between 0.5 and 15 percent by weight (calculated on the quantity of carrier material) are preferred.

Catalysts in various forms may be used, for example as metal oxides or sulfides. However, the sulfide form is preferred since they possess as a rule the highest activity.

Favorable results are obtained with catalysts containing rhenium or molybdenum, nickel and/or cobalt, the metal, or metals, being entirely or partially present in sulfided form.

Furthermore, it has been found that increased hydrocarbon conversion as well as a longer catalyst life can be achieved by the use of catalyst promoters. Suitable promoters are one or more metals from Group I of the Periodic System of Elements. Very good results are obtained with catalysts containing rhenium and a smaller amount of silver and potassium.

The conversion of hydrocarbon with steam according to the invention may take place in the presence of ammonia or compounds which under the reaction conditions are entirely or partially converted to ammonia. The addition of these compounds leads to a considerably increased catalyst stability resulting in more uniform conversion. As already observed, catalysts in sulfide form are the most active.

Sulfiding of the metallic and/or oxide catalyst may take place by contacting with hydrogen sulfide or preferable a mixture of hydrogen sulfide and hydrogen. Sulfiding may, however, also be successfully conducted by contacting the catalyst with a sulfur-containing hydrocarbon oil boiling below 350° C. Here, too, the sulfiding is preferably conducted in the presence of hydrogen. Favorable results are obtained when sulfiding is carried out in the liquid phase and in the presence of hydrogen with a sulfur-containing hydrocarbon oil obtained by straight distillation of crude oil.

Natural or synthetic aluminas are preferably used as catalyst carriers. Carriers with strongly acidic properties such as silica and silica-alumina are less suitable. In general, the presence of a certain quantity of other oxides in addition to alumina is not harmful but the silica content of the carrier should generally not exceed 5% w. Aluminas containing less than 0.5% w. silica are preferred.

Further it has been found that the wholly or partially deactivated catalyst can be regenerated for reuse. Regeneration may be effected by treatment at elevated temperature, for instance from 400 to 500° C., and, if necessary, at elevated pressure with a gas mixture containing oxygen and steam. The regenerated catalyst should also be sulfided by one of the procedures described above. Air is usually employed as an oxygen source in regeneration.

Suitable feed stocks for the process of the invention are in general hydrocarbons (which may or may not contain sulfur) boiling below 250° C. Especially suitable feeds are alkyl aromatics, which are converted to aromatics of lower molecular weight, hydrogen and low-molecular weight paraffinic hydrocarbons. Alkyl aromatics are dealkylated incompletely but selectively in the process. For example, the reaction product obtained from the conversion of toluene consists of hydrogen, benzene, carbon dioxide and unconverted toluene, whereas only traces of carbon monoxide and methane are formed. However, the unconverted toluene can be recycled to obtain complete conversion to hydrogen, benzene and carbon dioxide.

The net production of hydrogen is sufficient or nearly sufficient to convert, if desired, the benzene produced into cyclohexane. Similarly xylenes, ethylbenzene and higher alkylbenzenes may be converted according to the process of the invention into benzene, hydrogen and carbon dioxide. Aromatic oil fractions, such as those containing toluene, may also be employed as feed.

The process according to the invention is very suitable for conversion of hydrocarbon oil fractions boiling below 250° C. into hydrogen and lower molecular hydrocarbons. Very suitable feeds for this purpose are $C_5$–$C_7$ fractions, of an aliphatic, naphthenic as well as an aromatic nature, tops fractions and light naphtha fractions obtained by straight distillation, and fractions obtained by catalytic reforming or by steamcracking of light hydrocarbon oil fractions.

In many cases the presence of sulfur in the starting material, for example from 0.001 to 10 percent by weight sulfur compounds (calculated as sulfur), has proven advantageous in reducing sulfur loss from the catalyst.

Sulfur compounds, too, may be used as the feed. For example, benzothiophene may be converted according to the process of the invention into toluene (and hydrogen sulfide), which can subsequently react to form benzene, hydrogen and carbon dioxide.

The novel process is very suitable for converting hydrocarbon oil fractions boiling between 50 and 200° C. into propane, butanes and lighter hydrocarbon oil fractions with an increased octane number. Naphthenes or naphthenic hydrocarbon oil fractions are particularly suitable for the production of these lighter hydrocarbon oil fractions with an increased octane number. Very favorable results are obtained with a naphthenic hydrocarbon oil fraction feed containing at least 20 and preferably at least 40% w. naphthenic hydrocarbons.

The amount of steam used in the process varies from 0.1 to 5 and preferably from 0.5 to 2 moles per carbon atom in the feed.

The process of the invention can be carried out at pressures and temperatures which vary between very wide limits. The pressure should be between 5 and 80 kg./cm.$^2$ and preferably between 15 and 50 kg./cm.$^2$. Temperature should be between 400 and 800° C. and preferably between 500 and 600° C.

Space velocity should be between 0.1 and 5 liters per hour per liter of catalyst and preferably between 0.5 and 1 liter per hour per liter of catalyst.

The process according to the invention lends itself very well to staged operation, preferably with higher temperatures in the successive stages.

In some cases it is advisable to purify the product gas by removal of the hydrogen sulfide and/or carbon dioxide. In other cases the hydrogen sulfide should not be removed, or removed only party when part of the gas produced is recycled, to reduce sulfur loss from the catalyst.

As already observed, small quantities of carbon monoxide are formed in the process according to the invention. If desired, the carbon monoxide may be converted into carbon dioxide and hydrogen with steam in a known manner. An alternative procedure for the removal of the carbon monoxide consists of converting it into methane and water by reaction with hydrogen.

The process according to the invention may be carried out continuously or semi-continuously.

BRIEF DESCRIPTION OF THE DRAWINGS

The attached drawings represent the experimental results of experiments carried out to illustrate the invention. The details of the figures are fully described in the respective examples.

EXAMPLE I

To investigate the influence of the addition of hydrogen when employing a catalyst containing 3.85 parts by weight of rhenium per 100 parts alumina, two continuous experiments were carried out. In experiment 1 no hydrogen was added and in experiment 2, 200 standard liters of technically pure hydrogen per liter of feed were added under otherwise similar conditions.

The feed was a naphtha having a boiling range of from 120 to 160° C. obtained by straight distillation of a crude oil originating from the Middle East. The sulfur content of this naphtha was 400 p.p.m. by weight.

The experiments were conducted under the following reaction conditions:

Temperature _____ ° C__ 525
Pressure _____ kg./cm.$^2$__ 40
Space velocity of the naphtha __l./l. catalyst/hour__ 0.5
Steam/naphtha ratio _____ kg./l__ 2

The results of the two experiments have been plotted in FIG. I. In this figure the conversion, in percent, (vertical axis) has been plotted versus the length of run in hours (horizontal axis). Curve 1 gives the results without addition of hydrogen, curve 2 the results obtained with addition of hydrogen.

From FIG. I it is clear that addition of hydrogen has a favorable effect on catalyst stability.

The average composition of the gaseous reaction products was a follows:

| | Experiment 1 (without $H_2$) | Experiment 2 (with $H_2$) |
|---|---|---|
| $H_2$ percent w | 7.4 | ¹8.1 |
| $CO_2$ calculated as C, percent w | 12.5 | 11.5 |
| CO, calculated as C, percent w | 0.4 | 0.4 |
| $C_1$, calculated as C, percent w | 17.8 | 16.3 |
| $C_2$, calculated as C, percent w | 22.2 | 21.4 |
| $C_3$, calculated as C, percent w | 26.4 | 29.6 |
| $C_4$, calculated as C, percent w | 13.1 | 12.6 |
| $H_2$ purity, percent w | 66 | 81 |

¹ Corrected for $H_2$ added.

The average conversion in experiment 1 (50 run hours) amounted to 27%; in experiment 2 (100 run hours) to 35%. Conversion in this and following examples is defined as the percentage feed converted to reaction product containing less than 4 carbon atoms per molecule. Hydrogen purity is expressed as $$\frac{\text{Percent v. } H_2}{\text{Percent v. } (H_2 + C_1 + C_2)} \times 100\%$$

The catalysts employed in this and the following examples were presulfided with a mixture of hydrogen and hydrogen sulfide (volume ratio of 9:1) at a maximum temperature of 375° C.

EXAMPLE II

Experiments were made with a catalyst containing 3.85 parts by weight of rhenium, 1.25 parts by weight of cobalt and 0.2 part by weight of potassium (basis 100 parts alumina).

The feed was the same naphtha described in Example I. Experiment 3 was caried out without addition of hydrogen. In experiment 4, 200 standard liters of technically pure hydrogen per liter of naphtha were added. Reaction conditions were identical to those of Example I.

The results obtained are shown in FIG. II. Curve 3 represents the results obtained without added hydrogen and curve 4 those obtained with addition of hydrogen. FIG. II clearly shows the beneficial effect of the addition of hydrogen on catalyst stability.

The average composition of the gaseous reaction products was as follows:

|  | Experiment 3 (without $H_2$) | Experiment 4 (with [1] $H_2$) |
|---|---|---|
| $H_2$, percent w | 7.8 | 15.8 |
| $CO_2$, calculated as C, percent w | 9.4 | 9.1 |
| CO, calculated as C, percent w | 0.4 | 0.4 |
| $C_1$, calculated as C, percent w | 16.4 | 14.2 |
| $C_2$, calculated as C, percent w | 25.8 | 21.3 |
| $C_3$, calculated as C, percent w | 26.1 | 30.5 |
| $C_4$, calculated as C, percent w | 14.1 | 18.7 |
| $H_2$ purity, percent v | 66 | 79 |

[1] Corrected for $H_2$ added.

The average conversion in experiment 3 (50 run hours) was 20% and in experiment 4 (100 run hours) was 37%.

EXAMPLE III

Three experiments were made in which the quantity of added hydrogen was varied, using a catalyst which contained 3.85 parts by weight of rhenium, 2.35 parts by weight of silver and 0.2 part by weight of potassium (basis 100 parts alumina).

The naptha described in Example I was used as feed. Experiments 5, 6 and 7 were carried out with $H_2$/oil ratios of 100, 200 and 800 standard liters of hydrogen per liter of naphtha, respectively.

Reaction conditions were similar to those described in Examples I and II. The results of the experiments are shown in FIG. III. Curves 5, 6 and 7 represents the results obtained in experiments 5, 6 and 7, respectively.

FIG. III clearly shows that an increase in the quantity of hydrogen added from 100 to 200 standard liters of hydrogen per liter of naphtha has a very favorable effect on catalyst stability and that the addition of 800 standard liters of hydrogen per liter of naphtha results in virtually stable operation.

The average composition of the gaseous reaction products was as follows:

|  | Experiment 5 (100 $H_2$/Oil) | Experiment 6 (200 $H_2$/Oil) | Experiment 7 (800 $H_2$/Oil) |
|---|---|---|---|
| $H_2$, percent w | a 6.9 | a 7.5 | a 8.4 |
| $CO_2$, calculated as C, percent w | 9.3 | 10.1 | 6.7 |
| CO, calculated as C, percent w | 0.1 | 0.3 | 0.1 |
| $C_1$, calculated as C, percent w | 15.2 | 13.8 | 15.0 |
| $C_2$, calculated as C, percent w | 23.8 | 19.4 | 19.4 |
| $C_3$, calculated as C, percent w | 29.6 | 29.8 | 27.4 |
| $C_4$, claculated as C, percent w | 15.1 | 19.0 | 22.9 |
| $H_2$ purity, percent v | 77 | 83 | 93 | a Corrected for $H_2$ added.

The average conversion over 100 run hours in experiments 5, 6 and 7 was 29%, 34% and 32%, respectively.

EXAMPLES I–III LIQUID PRODUCTS

The aromatic contents and the octane numbers of the $C_4$ plus portion of the reaction product obtained in experiments 1 to 7 are given in the following table.

The feed contained 15.5% v. of aromatics (determined according to the FIA method). The Research octane number (R-0) of this naphtha was 34 and the Research octane number with 1½ ml. of tetraethyl lead per gallon of naphtha (R-1.5) was 47.

| Catalyst Composition | $H_2$ Added | Aromatic Content | Octane Number R-0 | Octane Number R-1.5 | Average Conversion, percent |
|---|---|---|---|---|---|
| $Al_2O_3$/Re | 0 | 42 |  |  | 37 |
| $Al_2O_3$/Re | 200 | 44 | 77 | 85 | 35 |
| $Al_2O_3$/Re/Co/K | 0 | 41 |  |  | 20 |
| $Al_2O_3$/Re/Co/K | 200 | 54 | 86 | 92 | 37 |
| $Al_2O_3$/Re/Ag/K | 100 | 38 |  |  | 29 |
| $Al_2O_3$/Re/Ag/K | 200 | 61 | 88 | 94 | 34 |
| $Al_2O_3$/Re/Ag/K | 800 | 71 | 100 | 104 | 32 |

These data clearly show that conversion of naphtha with steam with added hydrogen lead to a very substantial increase in aromatic content and octane number of the $C_4$ plus product.

EXAMPLE IV

Two experiments were made using the catalyst described in Example III. The feed was a naphtha with a boiling range of from 120 to 160° C. originating from the Middle East.

The experiments were conducted under the following reaction conditions:

Temperature _____ ° C__ 500
Space velocity of the naphtha ___ l./l. catalyst/hr__ 0.25
Steam/naphtha ratio _____kg./l__ 4

In experiment 10 no hydrogen was added; in experiment 11, 400 standard liters of technically pure hydrogen were added per liter of naphtha. The results of these experiments are shown in FIG. IV, in which curve 10 indicates the changes in conversion in experiment 10 and curve 11 those in experiment 11.

FIG. IV, also, shows the beneficial effect of hydrogen addition, here under reaction conditions differing from those employed in Examples I to III.

The average composition of the gaseous reaction products was as follows:

|  | Experiment Number | |
|---|---|---|
|  | 10 (Without $H_2$) | 11 (With $H_2$) |
| $H_2$, percent w | 13.3 | [1] 12.3 |
| $CO_2$, calculated as C, percent w | 22.9 | 16.0 |
| CO, calculted as C, percent w | 0.2 | 0.2 |
| $C_1$, calculated as C, percent w | 13.8 | 11.8 |
| $C_2$, calculted as C, percent w | 11.8 | 12.9 |
| $C_3$, calculated as C, percent w | 24.5 | 27.2 |
| $C_4$, calculated as C, percent w | 13.5 | 19.5 |
| $H_2$ purity, percent v | 84 | 93 |

[1] Corrected for $H_2$ added.

The average conversion over 100 run hours was 24%, in experiment 10 and 29% in experiment 11.

EXAMPLE V

This example shows the influence of the addition of a nitrogen compound on the conversion of naphtha with steam in the presence of hydrogen. The catalyst employed was a composition containing 3.85 parts by weight of rhenium per 100 parts alumina.

In experiment 12 no nitrogen compound was added to the naphtha; in experiment 13 the naphtha contained 2600 p.p.m. n-butylamine.

Experiments 12 and 13 were conducted at 525° C. and a pressure of 40 kg./cm.$^2$. The $H_2$/oil ratio was 200 and the steam/oil ratio was 2 kg./l. Space velocity was 0.5 liter of naphtha per liter of catalyst per hour. In FIG. V the changes in conversion have been plotted in the manner described in Example I. The stabilizing effect of the addition of n-butylamine on catalyst activity is obvious.

The average composition of the gaseous reaction products was as follows.

|  | Experiment 12 (Without Amine) | Experiment 13 (With Amine) |
|---|---|---|
| $H_2$, percent w | a 8.1 | a 6.8 |
| $CO_2$, calculated as C, percent w | 11.5 | 11.5 |
| CO, calculated as C, percent w | 0.4 | 0.7 |
| $C_1$, calculated as C, percent w | 16.3 | 16.6 |
| $C_2$, calculated as C, percent w | 21.4 | 21.8 |
| $C_3$, calculated as C, percent w | 29.6 | 29.4 |
| $C_4$, calculated as C, percent w | 12.6 | 13.2 |
| $H_2$ purity, percent v | 81 | 78 | a Corrected for $H_2$ added.

The average conversion over 100 run hours was 35% for experiment 12 and 39% for experiment 13.

Analysis of the gaseous reaction products shows that the addition of n-butylamine has no significant influence on the composition of the gases produced.

EXAMPLE VI

In the following three experiments (Nos. 14 up to 16) a commercial supported Co/Mo catalyst was used. The catalyst contained 3.9 parts by weight cobalt and 10.8 parts by weight molybdenum (basis 100 parts alumina). Experiment 14 was carried out without addition of hydrogen; in experiments 15 and 16, 200 and 800 standard liters of hydrogen per liter of naphtha were added, respectively.

Reaction conditions were the same as described in Example I and the results of experiments 14 to 16 are shown in FIG. VI by curves 14–16.

The data show the beneficial effect of hydrogen addition on the stability of the Co/Mo catalyst.

The average composition of the gaseous reaction products obtained was:

|  | Experiment 14 | Experiment 15 | Experiment 16 |
|---|---|---|---|
| $H_2$, percent w | 5.0 | ᵃ 3.0 | ᵃ 0.5 |
| $CO_2$, calculated as C, percent w | 7.6 | 4.3 | 8.2 |
| CO, calculated as C, percent w | 0.2 | 0.1 | 0.4 |
| $C_1$, calculated as C, percent w | 14.7 | 13.2 | 14.6 |
| $C_2$, calculated as C, percent w | 25.7 | 26.6 | 27.0 |
| $C_3$, calculated as C, percent w | 27.1 | 30.3 | 31.3 |
| $C_4$, calculated as C, percent w | 19.9 | 22.5 | 18.1 |
| $H_2$ purity, percent v | 56 | 80 | 94 |

ᵃ Corrected for $H_2$ added.

EXAMPLE VII

This example gives the results of two experiments (Nos. 17 and 18) employing the same catalyst as in Example III.

The feed was a tops fraction boiling below 72° C., obtained by straight distillation of a crude oil originating from the Middle East. The experiments were carried out under the following reaction conditions: temperature 500° C., pressure 40 kg./cm.$^2$, space velocity of catalyst 0.25 liter of feed per liter of catalyst per hour. Steam was added at a rate of 4 kg. of steam per liter of feed.

In experiment 17 no hydrogen was added; in experiment 18, 400 standard liters of technically pure hydrogen per liter were used. The results of these two experiments are shown in FIG. VII.

As apparent from FIG. VII the addition of hydrogen results in completely stable operation.

The average composition of the gaseous reaction products was as follows:

|  | Experiment 17 No. $H_2$ | Experiment 18 400 Standard Liters of $H_2$ |
|---|---|---|
| $H_2$, percent w | 8.5 | ᵃ 4.8 |
| $CO_2$, calculated as C, percent w | 17.0 | 12.4 |
| CO, calculated as C, percent w | 0.2 | 0.2 |
| $C_1$, calculated as C, percent w | 14.3 | 11.9 |
| $C_2$, calculated as C, percent w | 11.0 | 11.7 |
| $C_3$, calculated as C, percent w | 35.0 | 35.2 |
| $C_4$, calculated as C, percent w | 14.0 | 23.8 |
| $H_2$ purity, percent v | 78 | 89 |

ᵃ Corrected for $H_2$ added.

The average conversion over 100 run hours was 50% in experiment 17 and a constant level of 37% was attained in experiment 18.

EXAMPLE VIII

This example gives the results of two continuous experiments (Nos. 19 and 20) in which the feed was toluene to which 0.1% w. of sulfur (in the form of thiophene) had been added.

The dealkylation of the toluene was carried out under the following reaction conditions: temperature 575° C., pressure 40 kg./cm.$^2$, space velocity of 0.5 liter of toluene per liter of catalyst per hour. To each liter of feed 2 kg. of steam was added.

The catalyst contained 1 part by weight of rhenium per 100 parts of alumina.

In experiment 19 no hydrogen was added; in experiment 20, 100 standard liters of hydrogen per liter of feed were added. The results of these two experiments are given in FIG. VIII. The addition of hydrogen considerably enhances catalyst stability. Conversion used in this example is defined as the percentage of toluene converted.

The average composition of the converted product was:

|  | Experiment 19 Without $H_2$ | Experiment 20 100 Standard Liters of $H_2$ |
|---|---|---|
| $H_2$, percent w | 7.2 | ᵃ 7.4 |
| $CO_2$, calculated as C, percent w | 11.8 | 10.7 |
| CO, calculated as C, percent w | 0.3 | 0.4 |
| $CH_4$, percent w | 1.8 | 2.8 |
| $C_2H_6$, percent w | 0.1 | 0.2 |
| $C_6H_6$, percent w | 78.8 | 78.5 |
| $H_2$ purity, percent v | 97 | 97 |

ᵃ Corrected for $H_2$ added.

The average conversion in experiment 19 over 40 run hours was 25%, in experiment 20 the average conversion over 50 run hours was 24%.

We claim as our invention:

1. In a process for the conversion of hydrocarbons boiling below about 250° C. to hydrogen and hydrocarbons of reduced carbon atoms per molecule wherein said hydrocarbons and from 0.1 to 5 moles of steam per carbon atom in the hydrocarbon are fed to a conversion zone containing a catalyst consisting essentially of 0.1–30% w. of a rhenium metal component supported on a carrier, the improvement which comprises adding to the feed at least 100 standard liters of hydrogen per liter of liquid hydrocarbon feed at standard conditions.

2. The improvement of claim 1 wherein the catalyst is promoted with a metal component from Group I of the Periodic System.

3. The improvement of claim 1 wherein the metal component is rhenium sulfide and the carrier is alumina.

4. The improvement of claim 1 wherein the metal component is rhenium in an amount from 0.5 to 15% w.

5. The improvement of claim 1 wherein the catalytic conversion is carried out at a pressure of from about 5 to 80 kg./cm.$^2$, a temperature of from about 400 to about 800° C., a space velocity of from about 0.1 to 5 liters of hydrocarbon feed per liter of catalyst per hour.

6. The improvement of claim 5 wherein the pressure is between 15 and 50 kg./cm.$^2$, the temperature is between 500 and 600° C., the liquid hourly space velocity is between 0.5 and 1, and the conversion is effected in the presence of from about 0.5 to 2 moles of steam per carbon atom in the hydrocarbon feed.

7. The improvement of claim 1 wherein the hydrocarbon is an oil fraction boiling between about 50 and 200° C.

8. The improvement of claim 1 wherein the hydrocarbon contains from 0.001 to 10 percent by weight sulfur compounds calculated as sulfur.

9. The improvement of claim 1 wherein the hydrocarbon is an alkyl aromatic which is dealkylated to a lower boiling aromatic and hydrogen.

References Cited

UNITED STATES PATENTS

| 2,734,929 | 2/1956 | Douman | 260—672 |
|---|---|---|---|
| 3,081,259 | 3/1963 | Donovan et al. | 208—216 |
| 3,108,063 | 10/1963 | Chin et al. | 208—354 |
| 3,178,486 | 4/1965 | Maerker et al. | 260—672 |
| 3,193,592 | 7/1965 | Eubank | 260—672 |
| 3,388,074 | 6/1968 | Reitmeier | 252—373 |
| 3,442,793 | 5/1969 | Carson | 208—108 |
| 3,449,078 | 10/1969 | Quik et al. | 23—212 |
| 3,413,214 | 11/1968 | Galbreath | 208—143 |
| 2,831,042 | 4/1958 | Sieg | 260—680 |
| 3,161,670 | 12/1964 | Adams et al. | 260—683.3 X |
| 3,291,850 | 12/1966 | Carson | 260—672 |
| 3,360,586 | 12/1967 | Bloch et al. | 260—683.3 |

DELBERT E. GANTZ, Primary Examiner

G. E. SCHMITKONS, Assistant Examiner

U.S. Cl. X.R.

23—212; 208—108, 111, 134; 252—439